Patented May 2, 1939

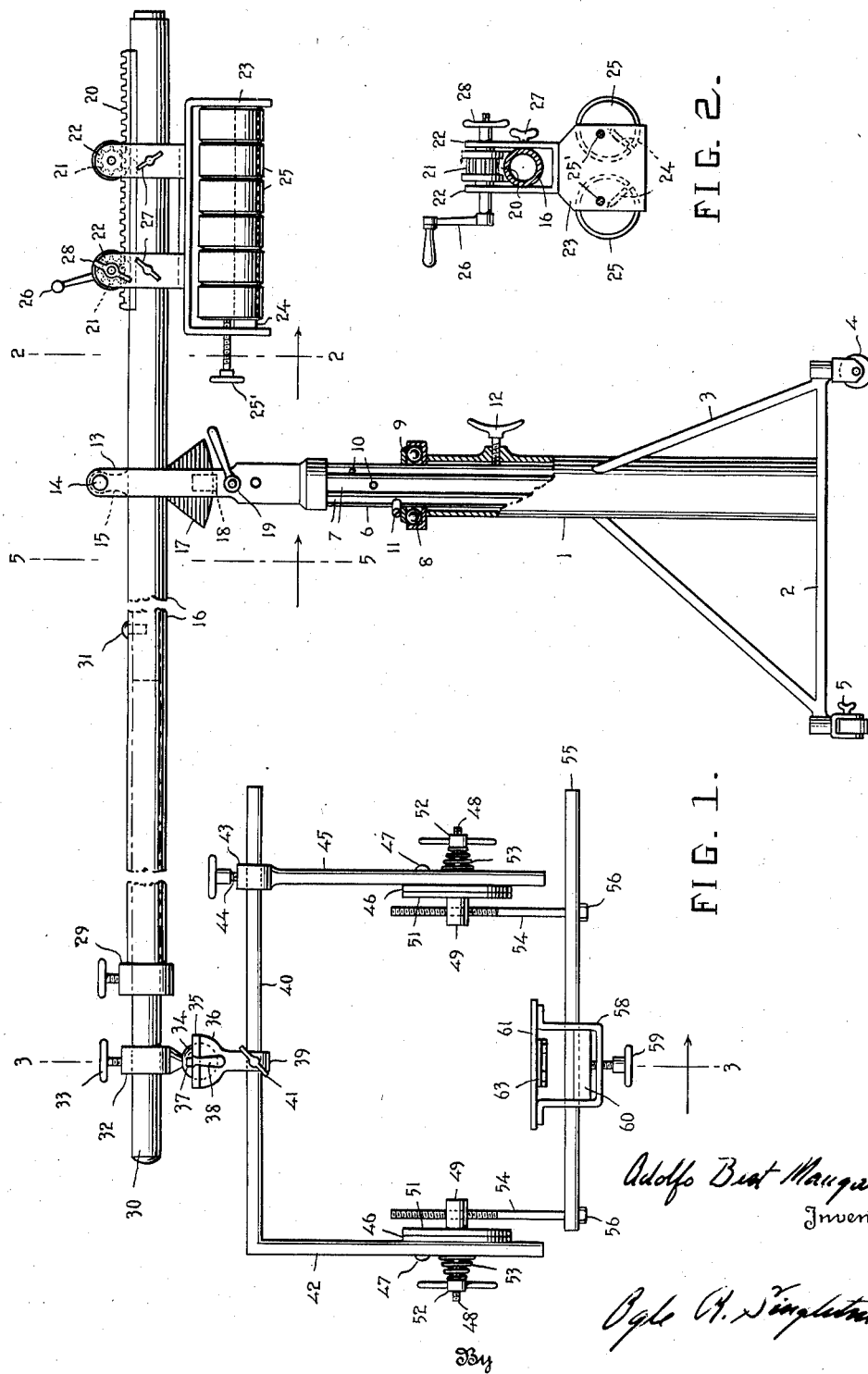

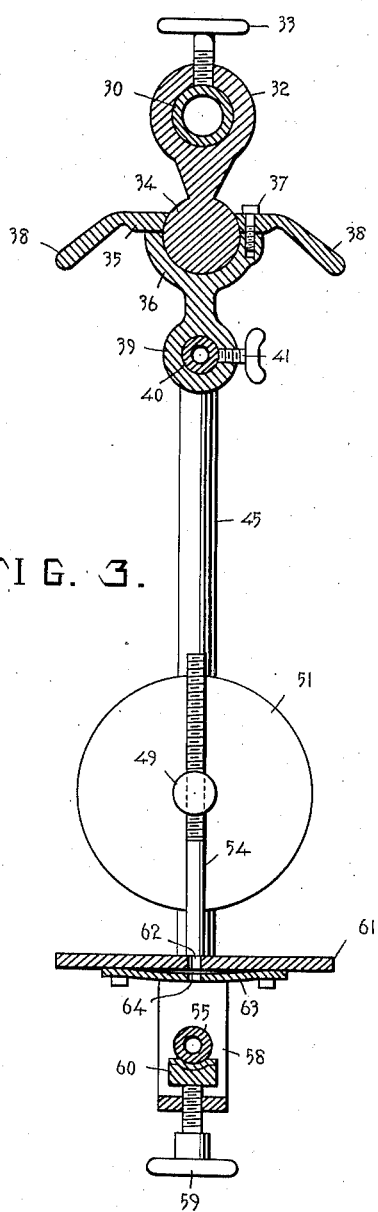
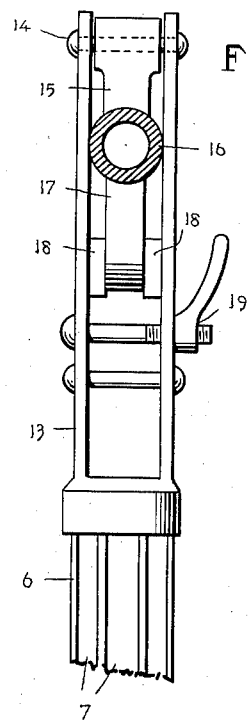
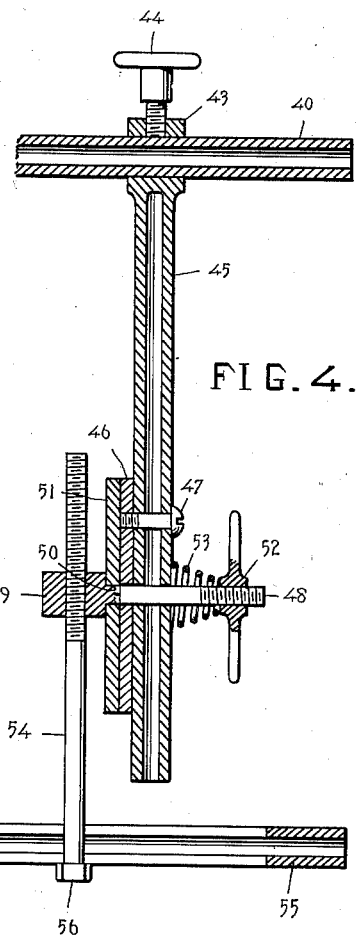

2,156,862

UNITED STATES PATENT OFFICE 2,156,862

MOUNT FOR CINEMA CAMERAS, ETC.

Adolfo Best Maugard, Mexico, D. F., Mexico

Application March 18, 1936, Serial No. 69,569
In Mexico March 20, 1935

6 Claims. (Cl. 248—123)

My invention consists in a new and useful improvement in mounts for cinema cameras, etc., and is designed more particularly to furnish means for supporting the very heavy cameras used in cinema studios, to facilitate their movement by providing a counterpoise to balance the weight of the camera, and a plurality of adjustment means to increase the mobility of the camera so mounted, and greatly decrease the effort required to dispose the camera as desired. The particularly novel and useful features of my improved device are the means for effecting the balance in the device to counteract the weight of a heavy camera, by means of a travelling counterpoise of variable weight, the rotatable and vertically adjustable support for the balance beam, the novel form of camera supporting platform suspended from the balance beam, and the manually adjustable universal joint between the balance beam and the platform.

While I have illustrated in the drawings filed herewith, and have hereinafter fully described one specific embodiment of my invention, it is to be distinctly understood that I do not consider my invention limited to said specific embodiment but refer for its scope to the claims appended hereto.

In the drawings:

Fig. 1 is a side elevation of my device.

Fig. 2 is a vertical section on the line 2—2 of Fig. 1.

Fig. 3 is a vertical section on the line 3—3 of Fig. 1.

Fig. 4 is a fragmentary, enlarged vertical section of the right-hand sustaining means for the camera supporting platform.

Fig. 5 is a vertical section on the line 5—5 of Fig. 1.

As illustrated in the drawings, my device has the tubular post 1 mounted on the base 2 and provided with the braces 3. The base 2 is provided with suitable casters 4 having set screws 5 to lock them against rotation. Slidably mounted in the post 1 is the tubular post 6 having longitudinal grooves 7. The post 1 is provided at its top end with the peripheral ball bearing 8 on which rests the peripheral plate 9 about the post 6 and having radial lugs received into the grooves 7. The post 6 is provided with a plurality of longitudinally spaced holes 10, and a pin 11 when inserted in any one of these holes 10 and resting upon the plate 9 serves to position the post 6 relative to the post 1, in various positions of vertical adjustment. A set screw 12 is provided in the post 1 to lock the post 6 in adjusted position. The post 6 terminates in a fork 13 having the pintle 14 on which is pivoted the yoke 15 carrying the tubular balance beam 16 from which depends, in the fork 13, the segmental plate 17 with which co-act the bearing plates 18 on the fork 13 to clamp the plate 17 when the fork 13 is compressed by the clamping bolt 19.

The rear end of the beam 16 is provided with a rack 20 with which meshes each of the pinions 21 journaled in hangers 22 depending below the beam 16, and from which is suspended the frame 23 provided with the racks 24 on which are carried the weights 25. Set screws 25' are provided to clamp the weights in position when they have been placed upon the racks 24. One of the pinions 21 is provided with the operating handle 26, and I provide set screws 27 on the hangers 22 to engage the beam 16, and a set screw 28 on the shaft of the pinion 21 having the handle 26, to engage the hanger 22 in which it is journaled.

The forward end of the beam 16 is provided with a clamping collar 29 to engage a rod 30 slidably received in the beam 16, a stop pin 31 being provided in the beam 16 to limit the inward movement of the rod 30. Slidably mounted on the rod 30 is the collar 32 having the set screw 33 and the depending ball 34 about which are received the co-acting upper and lower socket members 35 and 36, respectively, connected by the tensioning bolt 37 and having the operating handles 38. From the lower socket member 36 depends the collar 39 in which is slidably received the rod 40 clamped in adjusted position by the set screw 41. At the left end of the rod 40 (as illustrated in Fig. 1), there is a depending rod 42 formed integral with the rod 40. Adjacent the right end of the rod 40, there is the slidable collar 43, with set screw 44, from which depends the rod 45. Adjacent the lower end of the rod 45, on its inner side, is mounted the disc 46 by means of the bolt 47 transfixing the rod 45. Passed loosely through the center of this disc 46 and the rod 45 is the shaft 48 having the head 49 and the squared portion 50 on which is non-rotatably received the disc 51 contacting the disc 46, and of the same diameter therewith. The outer end of the shaft 48 is threaded to receive the wing nut 52, and disposed between the wing nut 52 and the rod 45 is the expansion coil spring 53.

It is to be understood that the above described construction from the disc 46 to the spring 53 is duplicated adjacent the lower end of the rod 42.

Threaded through each of the two heads 49 of the shafts 48 is a rod 54. These rods 54 are passed through a rod 55 and have hex heads 56 to support the rod 55 and provide means for adjusting the rods 54 relative to the heads 49. The rod 54 depending below the rod 45 is received through a slot 57 in the rod 55, to permit longitudinal adjustment of the rod 45 relative to the rod 40.

The rod 55 is passed loosely through the arms of a U-shaped bracket 58 provided with a set screw 59 having a grooved clamping plate 60 to engage the rod 55. Mounted upon the bracket 58 is the camera supporting table 61 having the central orifice 62 and the spring plate 63 with orifice 64 aligned with the orifice 62, to receive therethrough the usual clamping bolt on the bottom of the camera.

From the foregoing description of the details of construction of my device, it will be obvious that the camera mounted upon the supporting table 61 is rotatable about the vertical axis of the ball 34 and socket members 35 and 36, and about the horizontal axis of the shafts 48, which are intersecting axes.

It is to be noted that by the proper adjustment of the elements forming the frames for supporting the table 61, and the proper disposition of the table 61 relative thereto it is possible to so mount the camera supported by the table 61 that the center of gravity of the camera coincides with the point of intersection of the two axes.

Having described my invention, what I claim is:

1. In a mount for cinema cameras, the combination of a base; a post on said base; a balance beam pivoted on said post; a frame rotatable on a vertical axis on said beam and having two depending rods; a disc mounted on each rod; a rotatable shaft passed loosely through each disc and having a head; a disc non-rotatably mounted on each shaft and contacting the disc through which its shaft passes; tensioning means carried by said shafts to adjust the frictional contact of each pair of discs; and a camera supporting table slidably and rotatably suspended from said shaft heads.

2. In a mount for cinema cameras, the combination of a base; a frame rotatable on a vertical axis on said base and having two depending rods; a disc mounted on each rod; a rotatable shaft passed loosely through the center of each disc and its rod and having a head; a disc non-rotatably mounted on each of said shafts and contacting the disc through which its shaft passes; tensioning means carried by said shafts to adjust the frictional contact of each pair of discs; and a camera supporting table slidably and rotatably suspended from the shaft heads.

3. In a mount for cinema cameras, the combination of a base; a balance beam pivotally mounted on said base; a bracket on one end of said beam provided with a ball; a socket member embracing said ball; a collar about said ball and provided with operating handles; a tensioning screw adapted to adjust the tension between said socket member and said collar; and a camera supporting table carried by said socket member.

4. In an apparatus for supporting a mass, the combination of a fixed member; a frame carried by said member on a ball-and-socket connection, and having relatively adjustable arms; a pair of aligned rotatable shafts, each journaled in one of said arms and having a head; a rod threaded in each head; a third rod suspended from said threaded rods; and a table having a bracket slidable and rotatable about said third rod, and provided with means adapted to clamp said bracket to said third rod in adjusted positions.

5. In an apparatus for supporting a mass, the combination of a fixed member; a frame rotatable in a vertical axis carried by said member; a pair of rotatable shafts on said frame, each having a head; a rod threaded in each head; a third rod suspended from said threaded rods; and a table slidable and rotatable on said third rod, and provided with means adapted to clamp said table to said rod.

6. In an apparatus for supporting a mass, the combination of a fixed member; an universal joint on said member; a frame suspended from said joint; a second frame rotatable on an horizontal axis on said first frame and comprising rods adapted to be adjusted relative to said axis; and a table slidable and rotatable on said second frame.

ADOLFO BEST MAUGARD.